United States Patent
Kamata et al.

(10) Patent No.: US 9,400,571 B2
(45) Date of Patent: Jul. 26, 2016

(54) DRIVE CONTROLLING APPARATUS, ELECTRONIC DEVICE AND DRIVE CONTROLLING METHOD

(71) Applicant: FUJITSU LIMITED, Kawasaki-shi, Kanagawa (JP)

(72) Inventors: Yuichi Kamata, Isehara (JP); Kiyoshi Taninaka, Ebina (JP); Yasuhiro Endo, Ebina (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/453,790

(22) Filed: Aug. 7, 2014

(65) Prior Publication Data

US 2014/0347322 A1 Nov. 27, 2014

Related U.S. Application Data

(63) Continuation of application No. PCT/JP2013/076054, filed on Sep. 26, 2013.

(51) Int. Cl.
G06F 3/041 (2006.01)
G06F 3/01 (2006.01)

(52) U.S. Cl.
CPC ............... *G06F 3/041* (2013.01); *G06F 3/016* (2013.01)

(58) Field of Classification Search
CPC .............. G06F 3/016; G06F 2203/014; H01H 2003/008; H01H 2215/052; H01H 13/85
See application file for complete search history.

(56) References Cited

U.S. PATENT DOCUMENTS

| | | |
|---|---|---|
| 2002/0149561 A1 | 10/2002 | Fukumoto et al. |
| 2006/0109256 A1 | 5/2006 | Grant et al. |
| 2006/0119586 A1 | 6/2006 | Grant et al. |
| 2009/0085878 A1 | 4/2009 | Heubel et al. |
| 2009/0284485 A1 * | 11/2009 | Colgate et al. ............... 345/173 |
| 2010/0238115 A1 | 9/2010 | Komaarashi et al. |
| 2011/0157088 A1 | 6/2011 | Motomura et al. |

(Continued)

FOREIGN PATENT DOCUMENTS

| | | |
|---|---|---|
| EP | 2 230 582 A2 | 9/2010 |
| JP | 2002-149312 | 5/2002 |

(Continued)

OTHER PUBLICATIONS

Patent Abstracts of Japan, Publication No. 2003-316519, published Nov. 7, 2003.

(Continued)

*Primary Examiner* — Lixi C Simpson
*Assistant Examiner* — Ngan T Pham Lu
(74) *Attorney, Agent, or Firm* — Staas & Halsey LLP

(57) ABSTRACT

A drive controlling apparatus that drives a vibrating element of an electronic device including a display panel, a touch panel disposed on a display surface side of the display panel and the vibrating element generating a vibration in a manipulation input surface of the touch panel, includes a drive controlling part being configured to drive the vibrating element by using a driving signal causing the vibrating element to generate a natural vibration in an ultrasound-frequency-band in the manipulation input surface, the drive controlling part being configured to drive the vibrating element so that an intensity of the natural vibration varies in accordance with a position and a temporal change degree of the position of a manipulation input performed onto the manipulation input surface.

25 Claims, 14 Drawing Sheets

(56) References Cited

U.S. PATENT DOCUMENTS

| | | | |
|---|---|---|---|
| 2011/0285666 A1* | 11/2011 | Poupyrev | G06F 3/045 345/174 |
| 2011/0291976 A1 | 12/2011 | Takada et al. | |
| 2012/0081326 A1 | 4/2012 | Heubel et al. | |
| 2012/0081327 A1 | 4/2012 | Heubel et al. | |
| 2012/0256858 A1 | 10/2012 | Sudo | |
| 2012/0299857 A1 | 11/2012 | Grant et al. | |
| 2013/0285910 A1 | 10/2013 | Adachi et al. | |
| 2013/0314354 A1 | 11/2013 | Heubel et al. | |
| 2014/0139450 A1* | 5/2014 | Levesque | G08B 6/00 345/173 |

FOREIGN PATENT DOCUMENTS

| | | |
|---|---|---|
| JP | 2003-316519 | 11/2003 |
| JP | 2008-516348 | 5/2008 |
| JP | 2008-282380 | 11/2008 |
| JP | 2010-224684 | 10/2010 |
| JP | 2010-231609 | 10/2010 |
| JP | 2010-238222 | 10/2010 |
| JP | 2010-541071 | 12/2010 |
| JP | 2012-27765 | 2/2012 |
| JP | 2012-221179 | 11/2012 |
| JP | 2012-243189 | 12/2012 |
| JP | 2013-73612 | 4/2013 |
| JP | 2013-97438 | 5/2013 |
| JP | 2013-156682 | 8/2013 |
| TW | 201035804 | 10/2010 |
| WO | 2007/111909 A2 | 10/2007 |
| WO | WO 2009/042424 A1 | 4/2009 |
| WO | 2010/134349 A1 | 11/2010 |
| WO | 2013/108595 A1 | 7/2013 |
| WO | 2015/045482 A1 | 4/2015 |

OTHER PUBLICATIONS

Patent Abstracts of Japan, Publication No. 2010-231609, published Oct. 14, 2010.
Patent Abstracts of Japan, Publication No. 2010-238222, published Oct. 21, 2010.
Patent Abstracts of Japan, Publication No. 2012-221179, published Nov. 12, 2012.
International Search Report mailed Oct. 29, 2013, in corresponding International Patent Application No. PCT/JP2013/076054.
Japanese Office Action dated Oct. 7, 2014 in corresponding Japanese Patent Application No. 2014-538016.
Patent Abstracts of Japan, Publication No. 2013-97438, Published May 20, 2013.
Patent Abstracts of Japan, Publication No. 2012-27765, Published Feb. 9, 2012.
Korean Office Action dated Feb. 2, 2015 in corresponding Korean Patent Application No. 10-2014-7022980.
Patent Abstracts of Japan, Publication No. 2013-156682, Published Aug. 15, 2013.
Extended European Search Report dated Jul. 17, 2015 in corresponding European Patent Application No. 13874859.5.
Patent Abstracts of Japan, Publication No. 2002-149312, Published May 24, 2002.
Patent Abstracts of Japan, Publication No. 2012-243189, Published Dec. 10, 2012.
Japanese Office Action dated Mar. 31, 2015 in corresponding Japanese Patent Application No. 2014-538016.
Patent Abstracts of Japan, Publication No. 2010-224684, Published Oct. 7, 2010.
Patent Abstracts of Japan, Publication No. 2008-282380, Published Nov. 20, 2008.
Patent Abstracts of Japan, Publication No. 2013-073612, Published Apr. 22, 2013.
PCT Written Opinion of the International Searching Authority dated Jul. 21, 2015 in corresponding International Patent Application No. PCT/JP2015/063115.
Dohda, T. & Mochiyama, H., "The Printed-matter Typecasting Method for Haptic Feel Design and Sticky-band Illusion", The collection of papers of the 11$^{th}$ SICE system integration division annual conference (SI2010, Sendai), p. 174-177, 2010-2012.
Nakatani M. et al., "The Fishbone Tactile Illusion", Collection of papers of the 10$^{th}$ Congress of the Virtual Reality Society of Japan, Sep. 2005, 5 pages.
Australian Office Action mailed Apr. 28, 2016 in corresponding Australian Patent Application No. 2015202408, 3 pages.

* cited by examiner

| MOVING SPEED | AMPLITUDE VALUE |
|---|---|
| $0 \leqq V < b1$ | 0 |
| $b1 \leqq V < b2$ | A1 |
| $b2 \leqq V < b3$ | A2 |
|  |  |

(B)

| APPLICATION ID | AREA DATA | VIBRATION PATTERN |
|---|---|---|
| 1 | f1=(X,Y) | P1 |
| 1 | f2=(X,Y) | P2 |
| 1 | f3=(X,Y) | P3 |
| 1 | f4=(X,Y) | P4 |
|  |  |  |

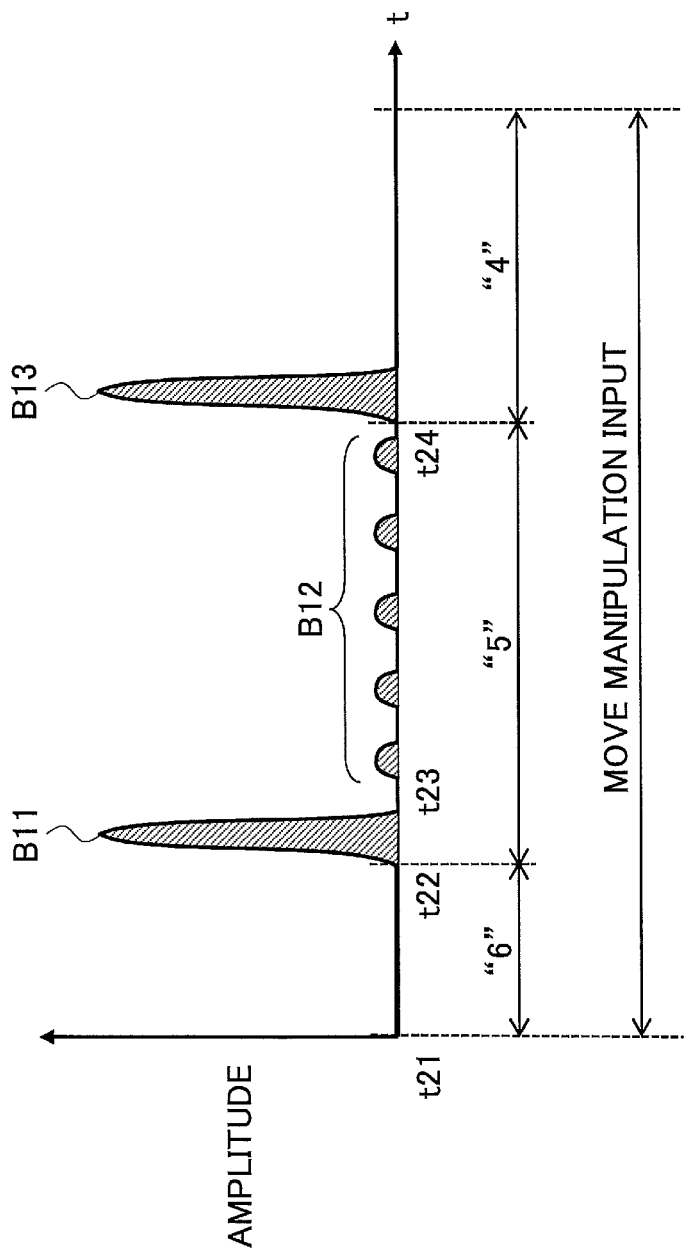

DRIVE CONTROLLING APPARATUS, ELECTRONIC DEVICE AND DRIVE CONTROLLING METHOD

CROSS-REFERENCE TO RELATED APPLICATION

This application is a continuation application of International Application PCT/JP2013/076054 filed on Sep. 26, 2013 and designated the U.S., the entire contents of which are incorporated herein by reference.

FIELD

The embodiment discussed herein is related to a drive controlling apparatus, an electronic device and a drive controlling method.

BACKGROUND

There has been a tactile sensation producing apparatus which includes a display, a contact detector that detects a contact state of user's manipulate operation to the display and a haptic vibration generating part which generates haptic vibration that gives a designated sensation to the user's body-part contacting the display (for example, see Patent Document 1).

The tactile sensation producing apparatus further includes a vibration waveform data generating means which generates a waveform data based on a detected result of the contact detector. The waveform data is used for generating the haptic vibration. The tactile sensation producing apparatus further includes an ultrasound modulating means which performs a modulating process on the waveform data by utilizing an ultrasound as a carrier wave and outputs an ultrasound signal generated by the modulating process to the haptic vibration generating means as a signal used for generating the haptic vibration.

The ultrasound modulating means performs either a frequency modulation or a phase modulation. The ultrasound modulating means further performs an amplitude modulation.

However, a ultrasound frequency used in the conventional tactile sensation producing apparatus may be any frequency as long as the frequency is higher than that of an audio frequency (about 20 kHz). No specific setting is made for the ultrasound frequency. Accordingly, the tactile sensation producing apparatus cannot provide a fine or crisp tactile sensation to the user.

RELATED-ART DOCUMENTS

Patent Documents

[Patent Document 1] Japanese Laid-open Patent Publication No. 2010-231609

SUMMARY

According to an aspect of the present application, there is provided a drive controlling apparatus that drives a vibrating element of an electronic device including a display panel, a touch panel disposed on a display surface side of the display panel and the vibrating element generating a vibration in a manipulation input surface of the touch panel, includes a drive controlling part being configured to drive the vibrating element by using a driving signal causing the vibrating element to generate a natural vibration in an ultrasound-frequency-band in the manipulation input surface, the drive controlling part being configured to drive the vibrating element so that an intensity of the natural vibration varies in accordance with a position and a temporal change degree of the position of a manipulation input performed onto the manipulation input surface.

The object and advantages of the disclosure will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 7 is a diagram illustrating a first data and a second data stored in a memory;

FIG. 14 is diagram illustrating an example of an operating state of the electronic device according to the embodiment.

DESCRIPTION OF EMBODIMENT

Hereinafter, an embodiment to which a drive controlling apparatus, an electronic device and a drive controlling method of the present invention are applied will be described.

Embodiment

Figure 1:
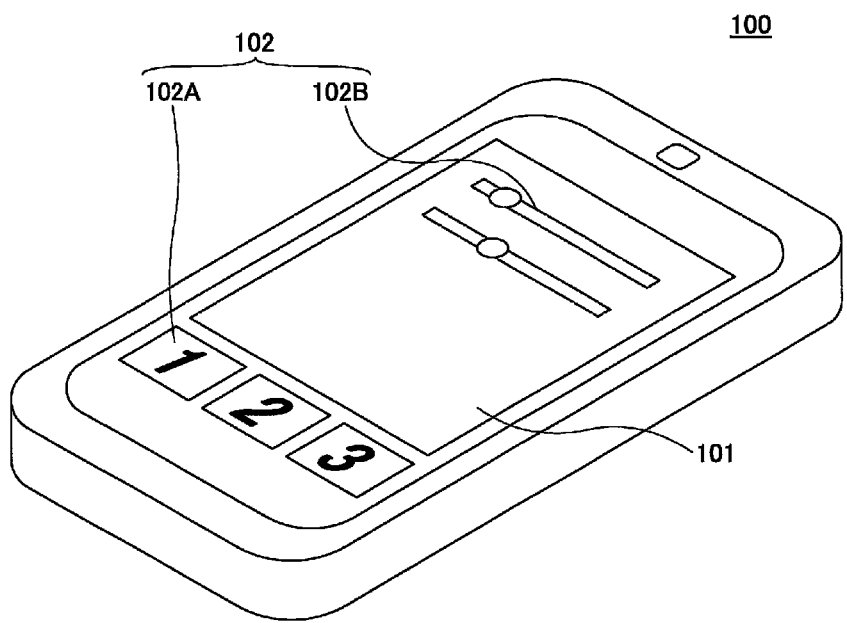
FIG. 1 is a diagram illustrating an electronic device according to an embodiment in perspective view.

FIG. 1 is a diagram illustrating an electronic device 100 according to the embodiment in perspective view.

The electronic device 100 is a smart phone or a tablet computer that includes a touch panel as a manipulation input part, for example. The electronic device 100 may be any device as long as the device includes a touch panel as a manipulation input part. Accordingly, the electronic device 100 may be a device such as a handy type information terminal device, an Automatic Teller Machine (ATM) placed at a specific location or the like, for example.

In a manipulation input part 101 of the electronic device 100, a display panel is disposed under a touch panel, and a button 102A, a slider 102B or the like (hereinafter referred to as Graphic User Interface (GUI) input part(s) 102) are displayed on the display panel.

A user of the electronic device 100 touches the manipulation input part 101 in order to manipulate (operate) the GUI input part 102 with a fingertip under normal conditions.

Hereinafter, a detailed configuration of the electronic device 100 will be described with reference to FIG. 2.

Figure 2:
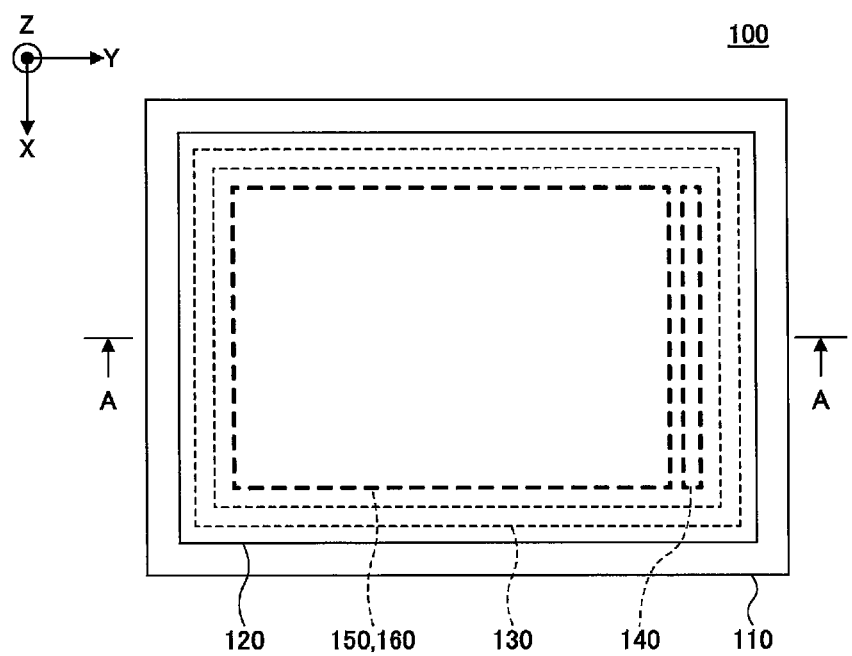
FIG. 2 is a diagram illustrating the electronic device of the embodiment in plan view.
Figure 3:
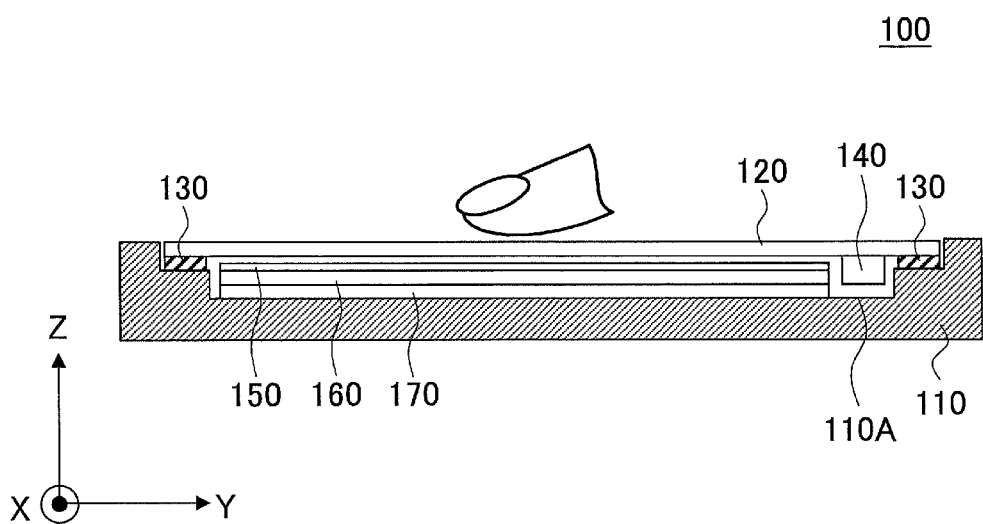
FIG. 3 is a diagram illustrating a cross-sectional view of the electronic device taken along a line A-A of FIG. 2.

FIG. 2 is a diagram illustrating the electronic device 100 of the embodiment in plan view. FIG. 3 is a diagram illustrating a cross-sectional view of the electronic device 100 taken along a line A-A of FIG. 2. An XYZ coordinate system as an orthogonal coordinate system is defined in FIGS. 2 and 3.

The electronic device 100 includes a housing 110, a top panel 120, a double-faced adhesive tape 130, a vibrating element 140, a touch panel 150, a display panel 160 and a substrate 170.

The housing 110 is made of a plastic, for example. As illustrated in FIG. 3, the substrate 170, the display panel 160 and the touch panel 150 are contained in a concave portion 110A of the housing 110, and a top panel 120 is adhered onto the housing 110 by the double-faced adhesive tape 130.

The top panel 120 is a plate-shaped member having a rectangular shape in plan view and is made of a transparent glass or a reinforced plastic such as polycarbonate. A surface of the top panel 120 which is located on a positive side in Z axis direction is one example of a manipulation input surface into which the user of the electronic device 100 performs a manipulation input.

The vibrating element 140 is bonded on a surface of the top panel 120 which is located on a negative side in Z axis direction, and the top panel 120 is adhered to the housing 110 by the double-faced adhesive tape 130. Herein, the double-faced adhesive tape 130 is not necessarily a rectangular-ring-shaped member in plan view as illustrated in FIG. 3, as long as the double-faced adhesive tape 130 can adhere four corners of the top panel 120 to the housing 110.

The touch panel 150 is disposed on the negative side in Z axis direction of the top panel 120. The top panel 120 is provided for the sake of protecting the surface of the touch panel 150. Another panel, protection film or the like may be provided onto the surface of the top panel 120.

In a state where the vibrating element 140 is bonded onto the surface of the top panel 120 located on the negative side in Z axis direction, the top panel 120 vibrates if the vibrating element 140 is being driven. In the embodiment, a standing wave is generated in the top panel 120 by causing the top panel 120 to vibrate at a natural vibration frequency (natural resonance frequency or eigenfrequency) of the top panel 120. Since the vibrating element 140 is bonded to the top panel 120, it is preferable to determine the natural vibration frequency in consideration of a weight of the vibrating element 140 or the like, in a practical manner.

The vibrating element 140 is bonded on the surface of the top panel 120 which is located on the negative side in Z axis direction at a location along the short side extending in X axis direction at a positive side in Y axis direction. The vibrating element 140 may be any element as long as it can generate vibration at an ultrasound-frequency-band. A piezoelectric element such as a piezo element is used as the vibrating element 140, for example.

The vibrating element 140 is driven in accordance with a driving signal output from the drive controlling part which will be described later. An amplitude (intensity) and a frequency of the vibration output from the vibrating element 140 is set (determined) by the driving signal. An on/off action of the vibrating element 140 is controlled in accordance with the driving signal.

The ultrasound-frequency-band is a frequency band which is higher than or equal to about 20 kHz, for example. According to the electronic device 100 of the embodiment, the frequency at which the vibrating element 140 vibrates is equal to a number of vibrations per unit time (frequency) of the top panel 120. Accordingly, the vibrating element 140 is driven in accordance with the driving signal so that the vibrating element 140 vibrates at a number of natural vibrations per unit time (natural vibration frequency) of the top panel 120.

The touch panel 150 is disposed on upper side (positive side in Z axis direction) of the display panel 160 and is disposed on lower side (negative side in Z axis direction) of the top panel 120. The touch panel 150 is one example of a coordinate detector which detects a position at which the user of the electronic device 100 touches the top panel 120. Hereinafter, the position is referred to as a position of the manipulation input.

The display panel 160 disposed under the touch panel 150 displays various GUI buttons or the like. Hereinafter, the various GUI buttons or the like are referred to as a GUI input part. The user of the electronic device 100 ordinarily touches the top panel 120 with a fingertip in order to manipulate (operate) the GUI input part.

The touch panel 150 is any coordinate detector as long as it can detect the position of the manipulation input onto the top panel 120 performed by the user. The touch panel 150 may be a capacitance type coordinate detector or a resistance film type coordinate detector, for example. Hereinafter, the embodiment in which the touch panel 150 is the capacitance type coordinate detector will be described. In a case where the touch panel 150 is the capacitance type, the touch panel 150 can detect the manipulation input performed onto the top panel 120 even if there is a clearance gap between the touch panel 150 and the top panel 120.

Although the top panel 120 is disposed on the manipulation input surface side of the touch panel 150 in the present embodiment, the top panel 120 may be integrated with the touch panel 150. In this case, the surface of the touch panel 150 is equal to the surface of the top panel 120 as illustrated in FIGS. 2 and 3, and the surface of the touch panel 150 becomes the manipulation input surface. Otherwise, the top panel 120 as illustrated in FIGS. 2 and 3 may be omitted. In this case, the surface of the touch panel 150 constitutes the manipulation input surface. In this case, the vibrating element 140 vibrates the manipulation input surface at a natural vibration frequency of a member having the manipulation input surface.

In a case where the touch panel 150 is the capacitance type, the touch panel 150 may be disposed on the top panel 120. In this case, the surface of the touch panel 150 constitutes the manipulation input surface. In a case where the touch panel 150 is the capacitance type, the top panel 120 as illustrated in FIGS. 2 and 3 may be omitted. In this case, the surface of the touch panel 150 constitutes the manipulation input surface. In this case, the vibrating element 140 vibrates the manipulation input surface at a natural vibration frequency of a member having the manipulation input surface.

The display panel 160 is a display part which displays a picture image. The display panel 160 may be a liquid crystal display panel, an organic Electroluminescence (EL) panel or the like, for example. The display panel 160 is disposed in the concave portion 110A of the housing 110 and is disposed on (the positive side in Z axis direction of) the substrate 170.

The display panel 160 is driven by a driver Integrated Circuit (IC) and displays the GUI input part, the picture image, characters, symbols, graphics or the like in accordance with an operating state of the electronic device 100.

The substrate 170 is disposed in the concave portion 110A of the housing 110. The display panel 160 and the touch panel 150 are disposed on the substrate 170. The display panel 160 and the touch panel 150 are fixed to the substrate 170 and the housing 110 by a holder or the like (not shown).

On the substrate 170, a drive controlling apparatus which will be described hereinafter and circuits or the like that are necessary for driving the electronic device 100 are mounted.

In the electronic device 100 having the configuration as described above, when the user touches the top panel 120 with the fingertip and a movement of the fingertip is detected, the drive controlling part mounted on the substrate 170 drives the vibrating element 140 so that the top panel 120 vibrates at a frequency in the ultrasound-frequency-band. The frequency in the ultrasound-frequency-band is a resonance frequency of a resonance system including the top panel 120 and the vibrating element 140. A standing wave is generated in the top panel 120 at the frequency.

The electronic device 100 generates the standing wave in the ultrasound-frequency-band in the top panel 120 and provides a tactile sensation (haptic sensation) to the user through the top panel 120.

Next, the standing wave generated in the top panel 120 is described with reference to FIG. 4.

Figure 4:
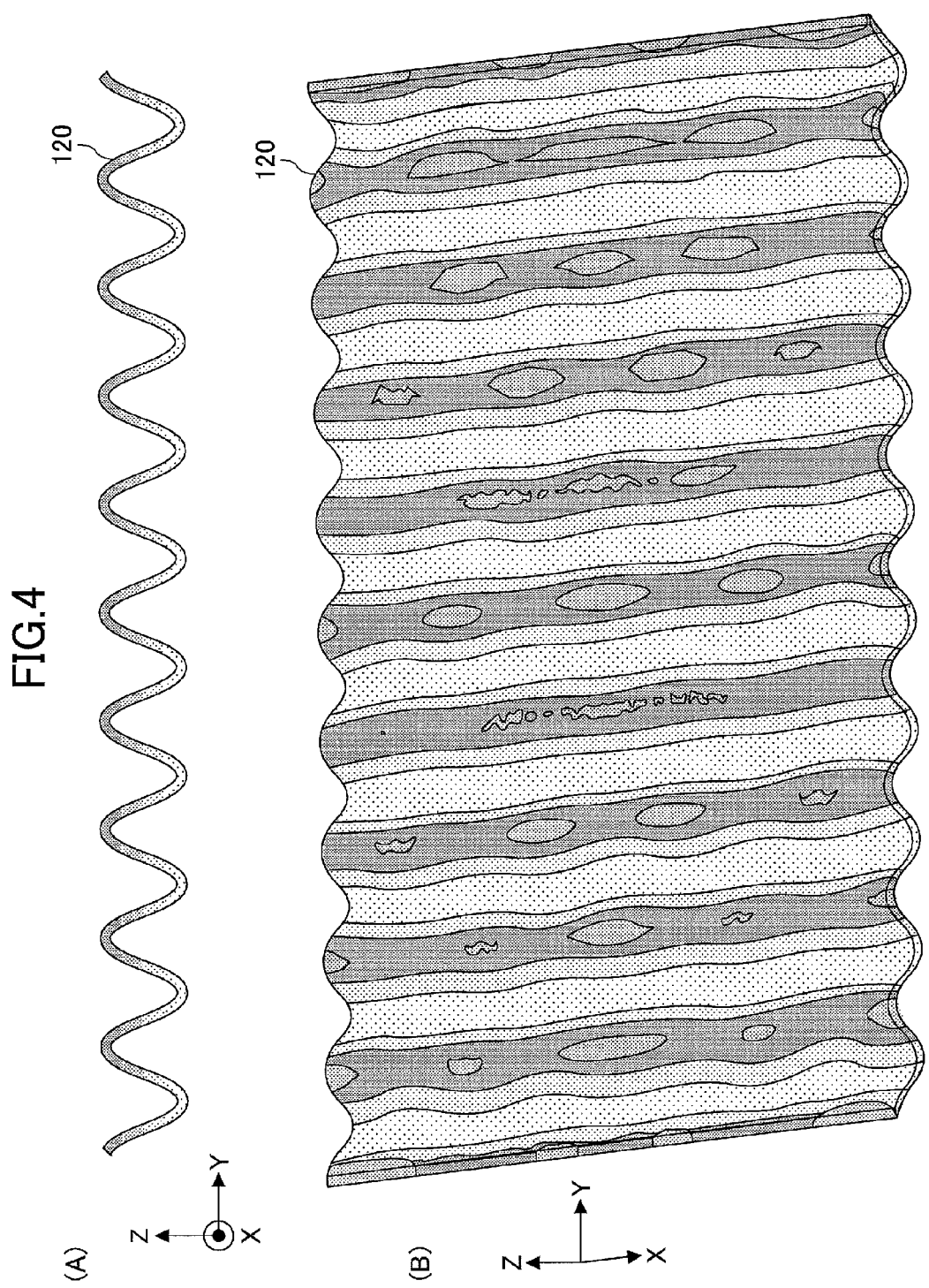
FIG. 4 is a diagram illustrating crests and troughs of a standing wave formed in parallel with the short side of a top panel.

FIG. 4 is a diagram illustrating crests and troughs of the standing wave formed in parallel with the short side of the top panel 120 included in the standing waves generated in the top panel 120 by the natural vibration at the ultrasound-frequency-band. A part (A) of FIG. 4 illustrates a side view, and a part (B) of FIG. 4 illustrates a perspective view. In parts (A) and (B) of FIG. 4, a XYZ coordinate system similar to that described in FIGS. 2 and 3 is defined. In parts (A) and (B) of FIG. 4, the amplitude of the standing wave is overdrawn in an easy-to-understand manner. The vibrating element 140 is omitted in parts (A) and (B) of FIG. 4.

The natural vibration frequency (the resonance frequency) f of the top panel 120 is represented by formulas (1) and (2) where E is the Young's modulus of the top panel 120, ρ is the density of the top panel 120, δ is the Poisson's ratio of the top panel 120, l is the long side dimension of the top panel 120, t is the thickness of the top panel 120, and k is a periodic number of the standing wave along the direction of the long side of the top panel 120. Since the standing wave has the same waveforms in every half cycle, the periodic number k takes values at 0.5 intervals.

The periodic number k takes 0.5, 1, 1.5, 2 . . . .

$$f = \frac{\pi k^2 t}{l^2} \sqrt{\frac{E}{3\rho(1-\delta^2)}} \quad (1)$$

$$f = \alpha k^2 \quad (2)$$

The coefficient α included in formula (2) corresponds to coefficients other than $k^2$ included in formula (1).

A waveform of the standing wave as illustrated in parts (A) and (B) of FIG. 4 is obtained in a case where the periodic number k is 10, for example. In a case where a sheet of Gorilla (registered trademark) glass of which the length 1 of the long side is 140 mm, the length of the short side is 80 mm, and the thickness t is 0.7 mm is used as the top panel 120, for example, the natural vibration number f is 33.5 kHz, if the periodic number k is 10. In this case, a frequency of the driving signal is 33.5 kHz.

The top panel 120 is a planar member. If the vibrating element 140 (see FIGS. 2 and 3) is driven and the natural vibration at the ultrasound-frequency-band is generated in the top panel 120, the top panel 120 is bent as illustrated in parts (A) and (B) of FIG. 4. As a result, the standing wave is generated in the top panel 120.

In the present embodiment, the single vibrating element 140 is bonded on the surface of the top panel 120 which is located on the negative side in Z axis direction at the location along the short side extending in X axis direction at the positive side in Y axis direction. The electronic device 100 may include two vibrating elements 140. In a case where the electronic device 100 includes two vibrating elements 140, another vibrating element 140 may be bonded on the surface of the top panel 120 which is located on the negative side in Z axis direction at a location along the short side extending in X axis direction at a negative side in Y axis direction. In this case, the two vibrating elements 140 are disposed at locations that are axially symmetric with respect to a center line of the top panel 120 parallel to the two short sides of the top panel 120.

In a case where the electronic device 100 includes two vibrating elements 140, the two vibrating elements 140 are driven in the same phase, if the periodic number k is an integer number. If the periodic number k is a decimal fraction, the two vibrating elements 140 are driven in opposite phases.

Next, the natural vibration at ultrasound-frequency-band generated in the top panel 120 of the electronic device 100 is described with reference to FIG. 5.

Figure 5:
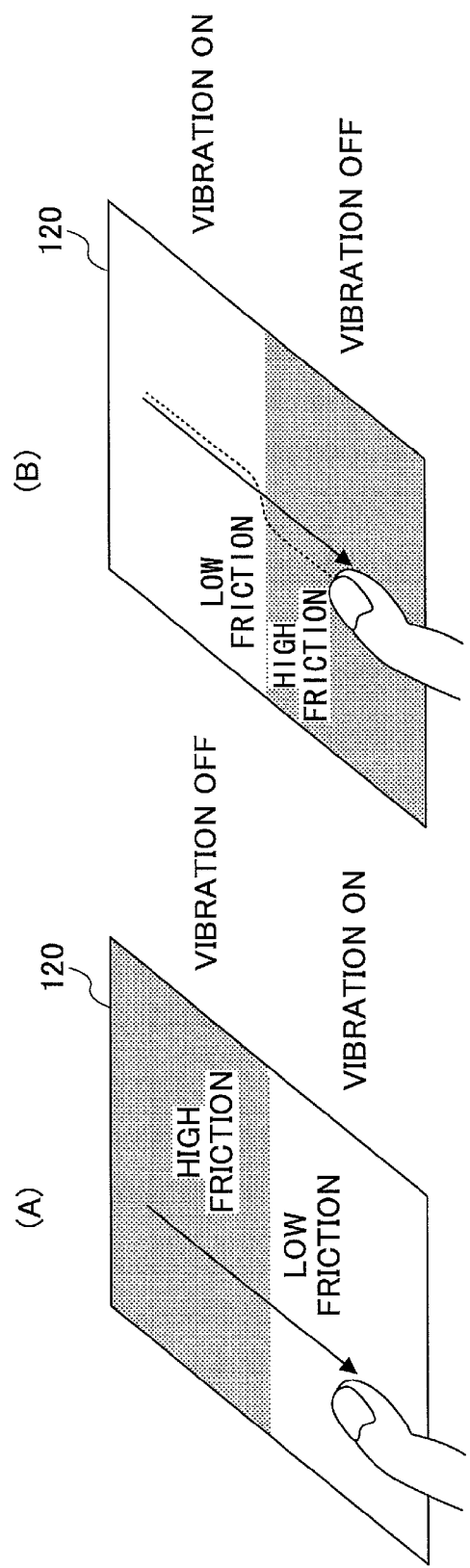
FIG. 5 is a diagram illustrating cases where a kinetic friction force applied to a fingertip varies when the natural vibration at the ultrasound-frequency-band is generated in the top panel of the electronic device.

FIG. 5 is a diagram illustrating cases where a kinetic friction force applied to the fingertip varies when the natural vibration at the ultrasound-frequency-band is generated in the top panel 120 of the electronic device 100. In FIG. 5, the manipulation input is performed with the fingertip. In parts (A) and (B) of FIG. 5, the user touches the top panel 120 with the fingertip and performs the manipulation input by tracing the top panel 120 with the fingertip in a direction from a far side to a near side with respect to the user. An on/off state of the vibration is switched by controlling an on/off state of the vibrating element 140 (see FIGS. 2 and 3).

In parts (A) and (B) of FIG. 5, areas in which the fingertip touches while the vibration is turned off are indicated in grey in the direction from the far side to the near side. Areas in which the fingertip touches while the vibration is turned on are indicated in white in the direction from the far side to the near side.

As illustrated in FIG. 4, the natural vibration at the ultrasound-frequency-band occurs on an entire surface of the top panel 120. Parts (A) and (B) of FIG. 5 illustrate operation patterns in which the on/off state of the natural vibration is switched while the fingertip of the user is tracing the top panel 120 in the direction from the far side to the near side.

Accordingly, in parts (A) and (B) of FIG. 5, the areas in which the fingertip touches while the vibration is turned off are indicated in grey in the direction from the far side to the near side. The areas in which the fingertip touches while the vibration is turned on are indicated in white in the direction from the far side to the near side.

In the operation pattern as illustrated in part (A) of FIG. 5, the vibration is turned off when the fingertip of the user is located on the far side of the top panel 120, and the vibration is turned on in the process of tracing the top panel 120 with the fingertip toward the near side.

On the contrary, in the operation pattern as illustrated in part (B) of FIG. 5, the vibration is turned on when the fingertip of the user is located on the far side of the top panel 120, and the vibration is turned off in the process of tracing the top panel 120 with the fingertip toward the near side.

In a state where the natural vibration at the ultrasound-frequency-band is generated in the top panel 120, a layer of air intervenes between the surface of the top panel 120 and the fingertip. The layer of air is provided by a squeeze film effect. As a result, a kinetic friction coefficient on the surface of the top panel 120 is decreased when the user traces the surface with the fingertip.

Accordingly, in the grey area located on the far side of the top panel 120 as illustrated in part (A) of FIG. 5, the kinetic friction force applied to the fingertip becomes larger. In the white area located on the near side of the top panel 120, the kinetic friction force applied to the fingertip becomes smaller.

Therefore, the user who is performing the manipulation input to the top panel 120 in a manner as illustrated in part (A) of FIG. 5 senses a reduction of the kinetic friction force applied to the fingertip when the vibration is turned on. As a result, the user senses a slippery or smooth touch (texture) with the fingertip. In this case, the user senses as if a concave portion is provided on the surface of the top panel 120 when the surface of the top panel 120 becomes slippery and the kinetic friction force becomes lower.

On the contrary, in the white area located on the far side of the top panel 120 as illustrated in part (B) of FIG. 5, the kinetic friction force applied to the fingertip becomes smaller. In the grey area located on the near side of the top panel 120, the kinetic friction force applied to the fingertip becomes higher.

Therefore, the user who is performing the manipulation input in the top panel 120 in a manner as illustrated in part (B) of FIG. 5 senses an increase of the kinetic friction force applied to the fingertip when the vibration is turned off. As a result, the user senses a grippy or scratchy touch (texture) with the fingertip. In this case, the user senses as if a convex portion is provided on the surface of the top panel 120 when the surface of the top panel 120 becomes grippy and the kinetic friction force becomes higher.

Accordingly, the user can sense a concavity or convexity with the fingertip in cases as illustrated in parts (A) and (B) of FIG. 5. For example, "The Printed-matter Typecasting Method for Haptic Feel Design and Sticky-band Illusion" (The collection of papers of the 11$^{th}$ SICE system integration division annual conference (SI2010, Sendai)_174-177, 2010-12) discloses that a human can sense a concavity or a convexity. "Fishbone Tactile Illusion" (Collection of papers of the 10th Congress of The Virtual Reality Society of Japan (September, 2005)) discloses that a human can sense a concavity or a convexity as well.

Although a variation of the kinetic friction force when the vibration is switched on or off is described above, a variation of the kinetic friction force similar to those described above is obtained when the amplitude (intensity) of the vibrating element 140 is varied.

In the following, a configuration of the electronic device 100 according to the embodiment is described with reference to FIG. 6.

Figure 6:
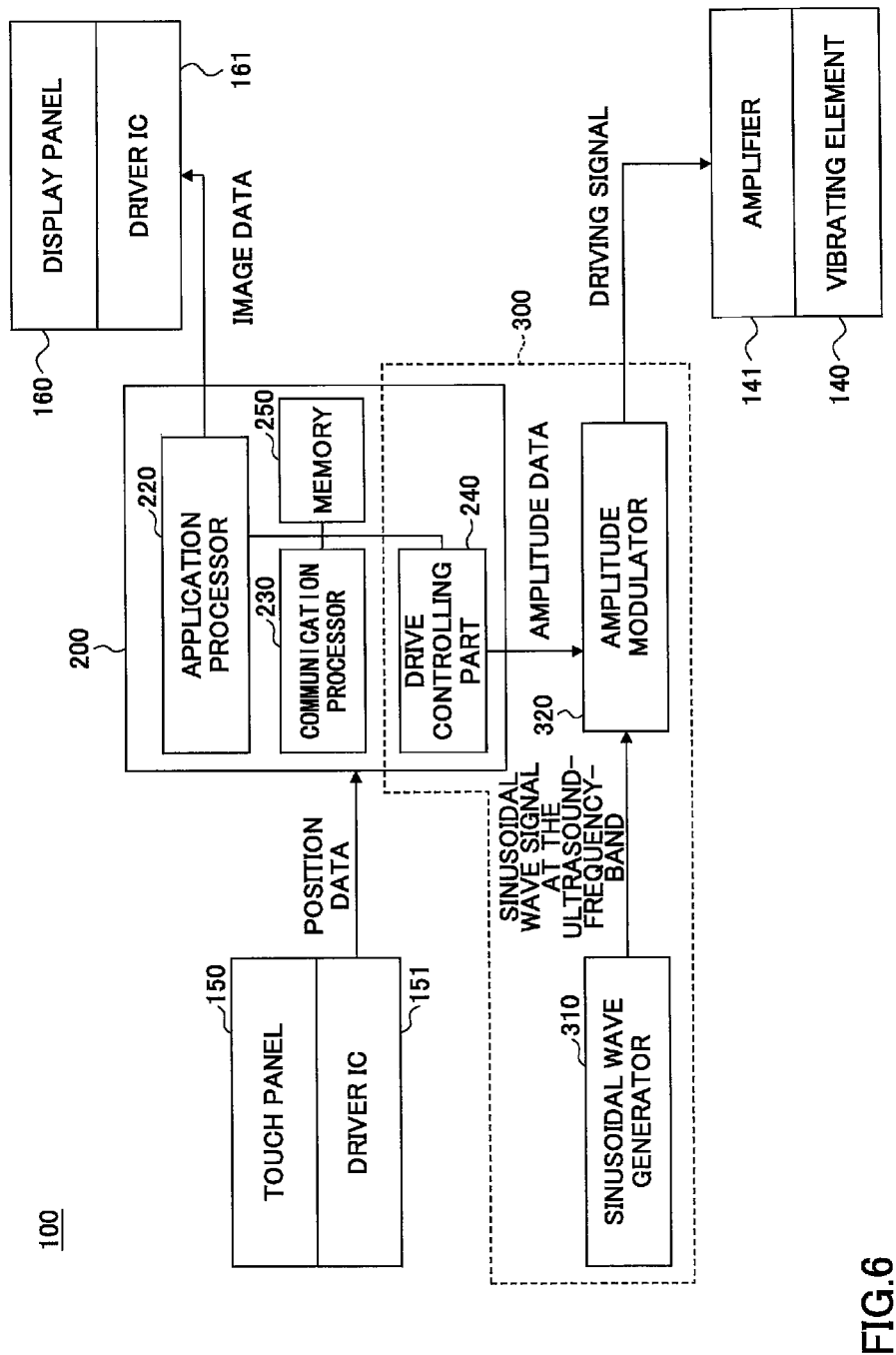
FIG. 6 is a diagram illustrating the configuration of the electronic device according to the embodiment.

FIG. 6 is a diagram illustrating the configuration of the electronic device 100 according to the embodiment.

The electronic device 100 includes the vibrating element 140, an amplifier 141, the touch panel 150, a driver Integrated Circuit (IC) 151, the display panel 160, a driver IC 161, a controller 200, a sinusoidal wave generator 310 and a amplitude modulator 320.

The controller 200 includes an application processor 220, a communication processor 230, a drive controlling part 240 and a memory 250. The controller 200 is realized by an IC chip, for example.

The drive controlling part 240, the sinusoidal wave generator 310 and the amplitude modulator 320 constitute a drive controlling apparatus 300. Although an embodiment in which the application processor 220, the communication processor 230, the drive controlling part 240 and the memory 250 are included in the single controller 200 is described, the drive controlling part 240 may be disposed outside of the controller 200 and realized by another IC chip or a processor. In this case, data which is necessary for a drive control performed by the drive controlling part 240 among data stored in the memory 250 may be stored in another memory disposed in the drive controlling apparatus 300.

In FIG. 6, the housing 110, the top panel 120, the double-faced adhesive tape 130 and the substrate 170 (see FIG. 2) are omitted. Herein, the amplifier 141, the driver IC 151, the driver IC 161, the drive controlling part 240, the memory 250, the sinusoidal wave generator 310 and the amplitude modulator 320 are described.

The amplifier 141 is disposed between the drive controlling apparatus 300 and the vibrating element 140. The amplifier 141 amplifies the driving signal output from the drive controlling apparatus 300 and drives the vibrating element 140.

The driver IC 151 is connected to the touch panel 150. The driver IC 151 detects position data representing the position on the touch panel 150 at which the manipulation input is performed and outputs the position data to the controller 200. As a result, the position data is input to the application processor 220 and the drive controlling part 240. Inputting the position data to the drive controlling part 240 is equal to inputting the position data to the drive controlling apparatus 300.

The driver IC 161 is connected to the display panel 160. The driver IC 161 inputs image data output from the drive controlling apparatus 300 to the display panel 160 and displays a picture image on the display panel 160 based on the image data. Accordingly, the GUI input part, the picture image and the like are displayed on the display panel 160 based on the image data.

The application processor 220 executes various application programs included in the electronic device 100.

The communication processor 230 performs processes that are necessary for communications of 3rd Generation (3G), 4th Generation (4G), Long Term Evolution (LTE), WiFi or the like of the electronic device 100.

The drive controlling part 240 outputs an amplitude data to the amplitude modulator 320 in a case where two designated condition are satisfied. The amplitude data represents an amplitude value used for controlling an intensity of the driving signal used for driving the vibrating element 140. The amplitude value is set in accordance with a temporal change degree of the position data. A moving speed of the user's fingertip tracing along the surface of the top panel 120 is used as the temporal change degree of the position data. The drive controlling part 240 calculates the moving speed of the user's fingertip based on a temporal change degree of the position data input from the driver IC 151.

The higher the moving speed becomes, the smaller the drive controlling apparatus 300 controls the amplitude value to be, for the sake of making an intensity of the tactile sensation sensed by the user constant regardless of the moving speed of the fingertip, for example. The lower the moving speed becomes, the greater the drive controlling apparatus 300 controls the amplitude value to be, for the sake of making the intensity constant regardless of the moving speed of the fingertip, for example.

A first data which represents a relationship between the amplitude data representing the amplitude value and the moving speed is stored in the memory 250.

Although the amplitude value is set in accordance with the moving speed based on the first data in the present embodiment, the amplitude value A may be calculated based on formula (3). The higher the moving speed becomes, the smaller the amplitude value A calculated by formula (3) becomes. The lower the moving speed becomes, the greater the amplitude value A calculated by formula (3) becomes.

$$A = A_0 / \sqrt{|V|/a} \quad (3)$$

"$A_0$" is a reference value of the amplitude, "V" represents the moving speed of the fingertip and "a" is a designated constant value. In a case where the amplitude value A is calculated by using formula (3), data representing formula (3) and data representing the reference value $A_0$ and the designated constant value a may be stored in the memory 250.

The drive controlling apparatus 300 of the embodiment causes the top panel 120 to vibrate in order to vary the kinetic friction force applied to the user's fingertip when the fingertip traces along the surface of the top panel 120. Since the kinetic friction force occurs when the fingertip is in motion, the drive controlling part 240 causes the vibrating element 140 to vibrate when the moving speed becomes greater than or equal to a designated threshold speed. A first designated condition is satisfied in a case where the moving speed is greater than or equal to the designated threshold speed.

Accordingly, the amplitude value represented by the amplitude data output from the drive controlling part 240 becomes zero in a case where the moving speed is less than the designated threshold speed. The amplitude value is set to a designated amplitude value corresponding to the moving speed in a case where the moving speed is greater than or equal to the designated threshold speed. In a case where the moving speed is greater than or equal to the designated threshold speed, the higher the moving speed becomes, the smaller the amplitude value becomes. In a case where the moving speed is greater than or equal to the designated threshold speed, the lower the moving speed becomes, the greater the amplitude value becomes.

In the drive controlling apparatus 300 of the embodiment, the amplitude data is output to the amplitude modulator 320 in a case where the position of the fingertip performing the manipulation input is in a designated area which requires generating the vibration. A second designated condition is satisfied in a case where the position of the fingertip performing the manipulation input is in the designated area which requires generating the vibration.

The drive controlling apparatus 300 determines whether the position of the fingertip performing the manipulation input is in the designated area which requires generating the vibration based on whether the position is located in the designated area or not.

Positions of the GUI input parts displayed on the display panel 160, areas in which the picture images are displayed or areas in which entire pages are displayed are identified by area data which represents locations on the display panel 160. The area data is assigned to all the GUI input parts displayed on the display panel 160, all the areas in which the picture images are displayed and all the areas in which entire pages are displayed. The area data is assigned to all the GUI input parts and all the areas that are used in all application programs.

Accordingly, in a case where the drive controlling apparatus 300 determines, as the second designated condition, whether the position of the fingertip performing the manipulation input is in the designated area which requires generating the vibration, a kind (type) of the application program(s) executed by the electronic device 100 is of concern to the determination. This is because contents displayed on the display panel 160 are different depending on the kinds of the application program (application software).

Further, this is because kinds of the manipulation inputs are different depending on the kind of the application program (application software). The manipulation inputs are performed by tracing the fingertip(s) touching the surface of the top panel 120. There is a so-called flick operation as a kind of the manipulation input performed by tracing the fingertip(s) touching the surface of the top panel 120. The flick operation is performed in order to operate the GUI input part, for example. The flick operation is performed by flicking (snapping) the fingertip along the surface of the top panel 120 for a relatively-short distance.

In a case where the user turns over or flips a page, a swipe operation is performed, for example. The swipe operation is performed by swiping the fingertip along the surface of the top panel 120 for a relatively-long distance. The swipe operation is performed when the user turns over or flips the page or a photo, for example. A drag operation is performed when the user slides the slider (see the slider 102B as illustrated in FIG. 1) which is constituted by the GUI input part.

The manipulation inputs that are performed by tracing the fingertip along the surface of the top panel 120, such as the flick operation, the swipe operation and the drag operation that are introduced as examples, are used differently depending on the kinds of the application programs (software). Accordingly, in a case where the drive controlling apparatus 300 determines whether the position of the fingertip performing the manipulation input is located in the designated area which requires generating the vibration, the kind (type) of the application program(s) executed by the electronic device 100 is of concern to the determination.

The drive controlling part 240 determines whether the position represented by the position data input from the driver IC 151 is located in the designated area which requires generating the vibration by using the area data.

A second data, in which data representing kinds of the application programs (software), the area data and pattern data are associated with each other, is stored in the memory 250. The area data represents areas of the GUI input parts or the like in which the manipulation inputs are performed. The pattern data represents vibration patterns.

The drive controlling part 240 performs the following processes in order to interpolate a positional change of the position of the fingertip. The positional change arises in a period of time required from a point in time when the position data is input to the drive controlling apparatus 300 from the driver IC 151 to a point in time when the driving signal is calculated based on the position data.

The drive controlling apparatus 300 performs processing every designated control cycle. The drive controlling part 240 performs processing every designated control cycle as well. Supposing that the period of time required from the point in time when the position data is input to the drive controlling apparatus 300 to the point in time when the driving signal is calculated by the drive controlling part 240 based on the position data is Δt, the required period of time Δt is equal to a period of the single control cycle.

It is possible to calculate the moving speed of the fingertip as a velocity of a vector which has a starting point (x1, y1) represented by the position data input to the drive controlling apparatus 300 from the driver IC 151 and a terminal point (x2, y2) corresponding to the position of the fingertip after a lapse of the required period of time Δt.

The drive controlling part 240 estimates a coordinate point (x3, y3) after a lapse of the required period of time Δt by calculating a vector having a starting point (x2, y2) represented by the position data input to the drive controlling apparatus 300 from the driver IC 151 and a terminal point (x3, y3) corresponding to the position of the fingertip after a lapse of the required period of time Δt.

The electronic device 100 of the embodiment interpolates the positional change of the position of the fingertip having arisen in the required period of time by estimating a coordinate point after a lapse of the required period of time Δt as described above.

The drive controlling part 240 performs a calculation for estimating the coordinate point after a lapse of the required period of time Δt as described above. The drive controlling part 240 determines whether the estimated coordinate point is located in the designated area which requires generating the vibration and generates the vibration if the estimated coordinate point is located in the designated area. Accordingly, the second designated condition is that the estimated coordinate point is located in the designated area which requires generating the vibration.

The two designated conditions required for the drive controlling part 240 to output the amplitude data to the amplitude modulator 320 are that the moving speed of the fingertip is more than or equal to the designated threshold speed and that the estimated coordinate point is located in the designated area which requires generating the vibration.

The drive controlling part 240 reads the amplitude data having the amplitude value corresponding to the moving speed from the memory 250 and outputs the amplitude data to the amplitude modulator 320 in a case where the moving speed of the fingertip is more than or equal to the designated threshold speed and the estimated coordinate point is located in the designated area which requires generating the vibration.

The memory 250 stores the first data and the second data. The first data represents the relationship between the amplitude data representing the amplitude value and the moving speed. The second data associates the data representing the kinds of the application programs (software), the area data representing the GUI input part or the like to which the manipulation input is performed and the pattern data representing the vibration pattern.

The memory 250 stores data and programs that are necessary for the application processor 220 to execute the application program and data and programs that are necessary for the communication processor 230 to perform communication processing.

The sinusoidal wave generator 310 generates sinusoidal waves used for generating the driving signal which causes the top panel 120 to vibrate at the natural vibration frequency. For example, in a case of setting the natural vibration frequency f to 33.5 kHz and causing the top panel 120 to vibrate at 33.5 kHz, a frequency of the sinusoidal waves becomes 33.5 kHz. The sinusoidal wave generator 310 inputs a sinusoidal wave signal at the ultrasound-frequency-band to the amplitude modulator 320.

The amplitude modulator 320 generates the driving signal by modulating an amplitude of the sinusoidal wave signal input from the sinusoidal wave generator 310 based on the amplitude data input from the drive controlling part 240. The amplitude modulator 320 modulates only the amplitude of the sinusoidal wave signal at the ultrasound-frequency-band input from the sinusoidal wave generator 310 and does not modulate a frequency and a phase of the sinusoidal wave signal in order to generate the driving signal.

Therefore, the driving signal output from the amplitude modulator 320 is a sinusoidal wave signal at the ultrasound-frequency-band obtained by modulating only the amplitude of the sinusoidal wave signal at the ultrasound-frequency-band output from the sinusoidal wave generator 310. In a case where the amplitude data is zero, the amplitude of the driving signal becomes zero. This is the same as the amplitude modulator 320 not outputting the driving signal.

In the following, the first data and the second data stored in the memory 250 are described with reference to FIG. 7.

FIG. 7 is a diagram illustrating the first data and the second data stored in the memory 250.

As illustrated in part (A) of FIG. 7, the amplitude data representing the amplitude value and the moving speed are associated in the first data. According to the first data as illustrated in part (A) of FIG. 7, the amplitude value is set to 0 in a case where the moving speed V is greater than or equal to 0 and less than b1 (0<=V<b1), the amplitude value is set to A1 in a case where the moving speed V is greater than or equal to b1 and less than b2 (b1<=V<b2), and the amplitude value is set to A2 in a case where the moving speed V is greater than or equal to b2 and less than b3 (b2<=V<b3).

As illustrated in part (B) of FIG. 7, the data representing the kind of the application program, the area data representing the coordinate values of areas where the GUI input parts or the like to which the manipulation inputs are performed and the pattern data representing the vibration pattern are associated in the second data.

In part (B) of FIG. 7, application program ID (Identification) is illustrated as the data representing the kind of the application program. Formulas f1 to f4 representing the coordinate values of the GUI input parts or the like to which the manipulation inputs are performed are illustrated as the area data. P1 to P4 are illustrated as the pattern data representing the vibration patterns.

The application programs identified by the application program ID included in the second data include various kinds of application programs that can be used in a smart phone or a tablet computer. The application programs also include a program which realizes an email-edit mode.

In the following, processes executed by the drive controlling part 240 of the drive controlling apparatus 300 included in the electronic device 100 according to the embodiment are described with reference to FIG. 8.

Figure 8:
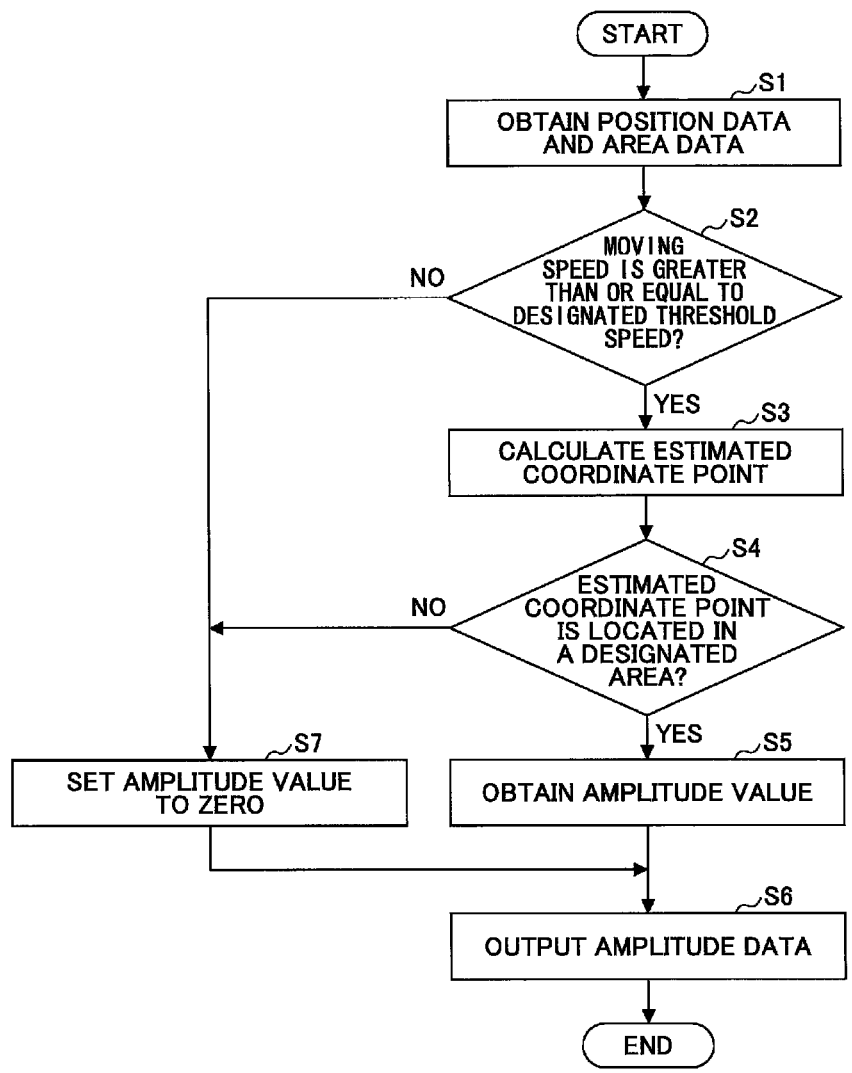
FIG. 8 is a diagram illustrating a flowchart executed by a drive controlling part of a drive controlling apparatus included in the electronic device according to the embodiment.

FIG. 8 is a diagram illustrating a flowchart executed by the drive controlling part 240 of the drive controlling apparatus 300 included in the electronic device 100 according to the embodiment.

An operating system (OS) of the electronic device 100 executes drive controls of the electronic device 100 every designated control cycle. Accordingly, the drive controlling apparatus 300 performs the processing every designated control cycle. The same applies to the drive controlling part 240. The drive controlling part 240 executes the flows as illustrated in FIG. 8 every designated control cycle.

Supposing that the period of time required from the point in time when the position data is input to the drive controlling apparatus 300 to the point in time when the driving signal is calculated by the drive controlling part 240 based on the position data is Δt, the required period of time Δt is almost equal to a period of the single control cycle.

A period of time of one cycle of the control cycle can be treated as a period of time corresponding to the required period of time Δt which is required from the point in time when the position data is input to the drive controlling apparatus 300 from the driver IC 151 to the point in time when the driving signal is calculated based on the position data.

The drive controlling part 240 starts processing when the electronic device 100 is turned on.

The drive controlling part 240 obtains the coordinate values represented by the present position data and the area data associated with the vibration pattern with respect to the GUI input part on which the manipulation input is being performed in accordance with the kind of the present application program (step S1).

The drive controlling part 240 determines whether the moving speed is greater than or equal to the designated threshold speed (step S2). The moving speed may be calculated by a vector operation. The threshold speed may be set to the minimum speed of the moving speed of the fingertip performing the manipulation input accompanied with a movement of the fingertip such as the flick operation, the swipe operation, the drag operation or the like. Such a minimum speed may be set based on an experimental result, a resolution of the touch panel 150 or the like.

The drive controlling part 240 calculates the estimated coordinate point after a lapse of the required period of time Δt based on the coordinate point represented by the present position data and the moving speed, in a case where the drive controlling part 240 has determined that the moving speed is greater than or equal to the designated threshold speed at step S2 (step S3).

The drive controlling part 240 determines whether the estimated coordinate point after a lapse of the required period of time Δt is located in an area St which is represented by the area data obtained at step S1 (step S4).

If the drive controlling part 240 determines that the estimated coordinate point after a lapse of the required period of time Δt is located in the area St represented by the area data obtained at step S1, the drive controlling part 240 obtains the amplitude data representing the amplitude value corresponding to the moving speed calculated at step S2 from the first data (step S5).

The drive controlling part 240 outputs the amplitude data (step S6). As a result, the amplitude modulator 320 generates the driving signal by modulating the amplitude of the sinusoidal wave output from the sinusoidal wave generator 310, and the vibrating element 140 is driven based on the driving signal.

In a case where the controlling part 240 has determined that the moving speed is not greater than or equal to the designated threshold speed at step S2 (S2: NO) and in a case where the drive controlling part 240 has determined that the estimated coordinate point after a lapse of the required period of time Δt is not located in the area St at step S4, the drive controlling part 240 sets the amplitude value to zero (step S7).

As a result, the drive controlling part 240 outputs the amplitude data having the amplitude value set to zero, and the amplitude modulator 320 generates the driving signal by modulating the amplitude of the sinusoidal wave output from the sinusoidal wave generator 310 to zero. Accordingly, in this case, the vibrating element 140 is not driven.

In the following, examples of the operating state of the electronic device 100 according to the embodiment are described with reference to FIGS. 9 to 14.

FIGS. 9 to 14 are diagrams illustrating the examples of the operating state of the electronic device 100 according to the embodiment. In FIGS. 9 to 14, XYZ coordinate systems similar to that described in FIGS. 2 and 4 are defined.

Figure 9:
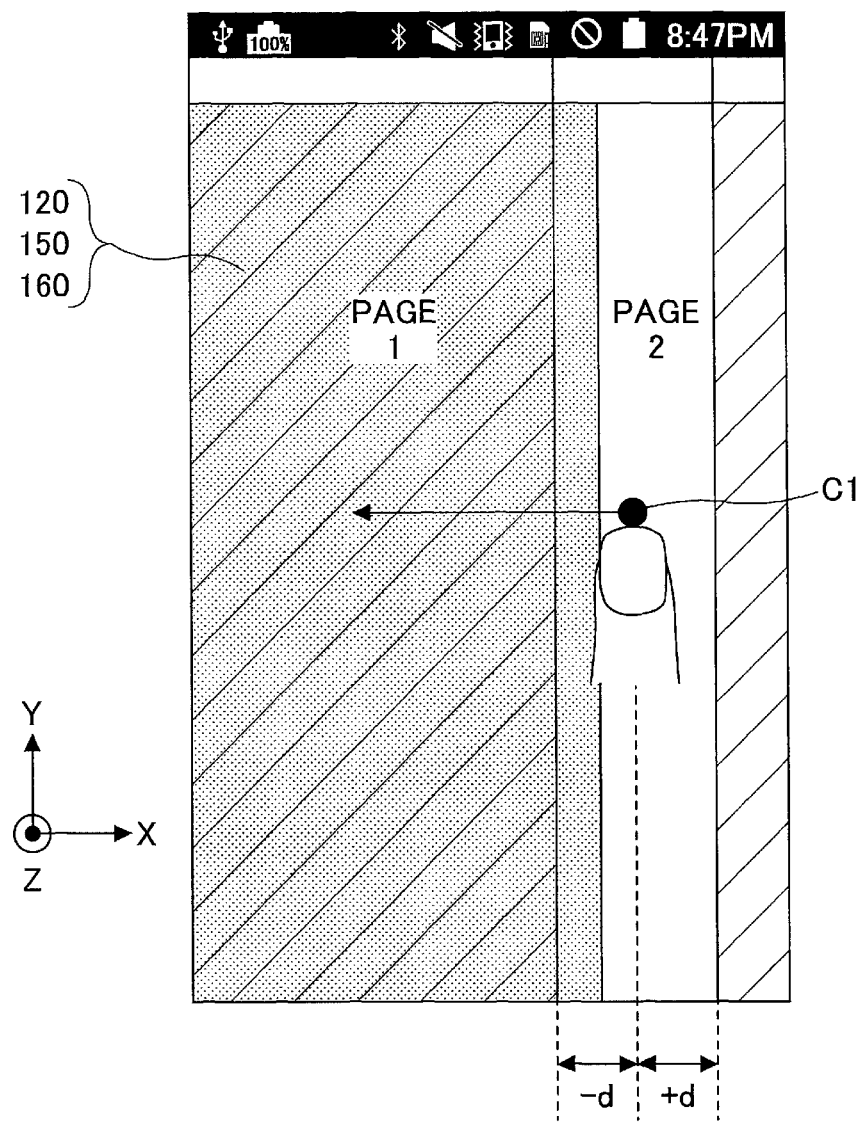
FIG. 9 is diagram illustrating an example of an operating state of the electronic device according to the embodiment.

FIG. 9 is a diagram illustrating the top panel 120, the touch panel 150 and the display panel 160 in plan view. The user of the electronic device 100 touches the page 1 indicated in grey with the fingertip and is about to open page 2 indicated in white by performing the swipe operation leftward. Accordingly, the content displayed on the display panel 160 of the electronic device 100 is about to transit from page 1 to page 2.

In an operation mode in which the page is turned over or flipped, the drive controlling part 240 determines whether the manipulation input is the swipe operation. For example, the drive controlling part 240 determines that the manipulation input is the swipe operation, if the position of the fingertip performing the manipulation input moves for ±d mm or more in X axis direction from the starting position at which the user touches the top panel 120 first with the fingertip. The drive controlling part 240 generates the vibration in the top panel 120 when the position of the fingertip enters into areas with oblique lines. Each of the areas with oblique lines is the area St.

Figure 10:
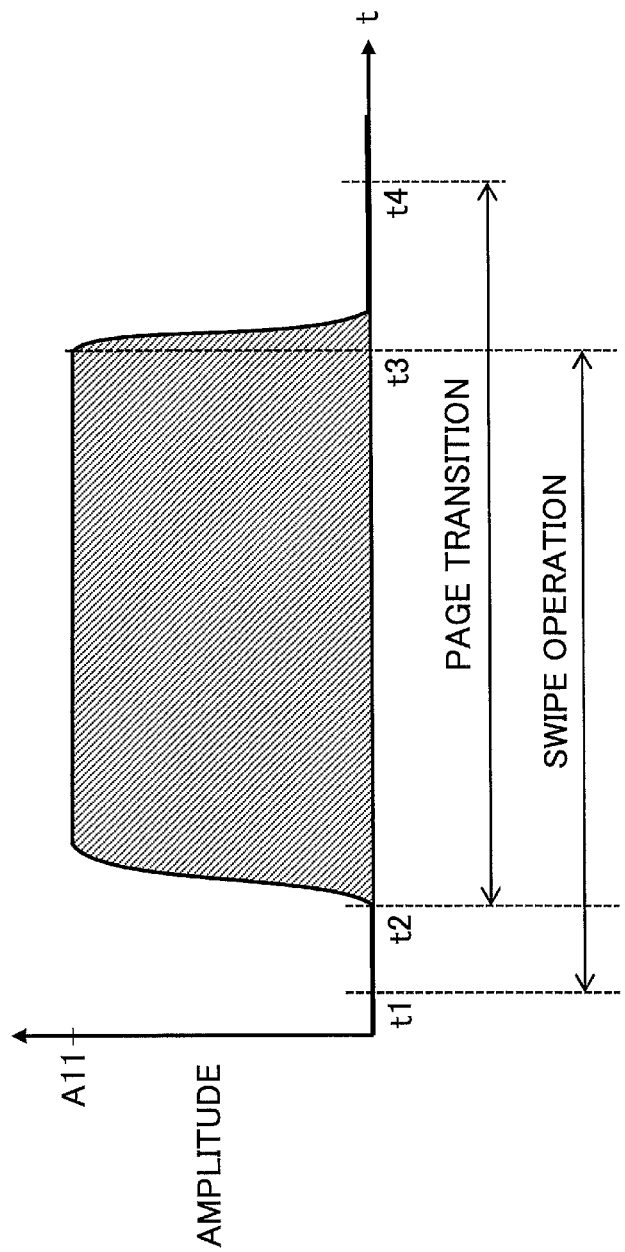
FIG. 10 is diagram illustrating an example of an operating state of the electronic device according to the embodiment.

Next, the vibration generated in the top panel 120 in a case where the manipulation input is performed as illustrated in FIG. 9 is described. The vibration is generated based on the driving signal output from the amplitude modulator 320. The driving signal is output from the amplitude modulator 320 based on the amplitude data output from the drive controlling part 240. In FIG. 10, a horizontal axis represents time, and a vertical axis represents the amplitude value of the amplitude data. Here, the moving speed of the fingertip supposes almost constant when the user performs the swipe operation.

The user touches the top panel 120 at a position C1 with the fingertip and begins to move the fingertip along the surface of the top panel 120 leftward at time point t1. At time point t2 when the user has moved the fingertip for d mm from the position C1, the drive controlling part 240 determines that the manipulation input is the swipe operation and drives the vibrating element 140 with the vibration pattern prepared for the swipe operation. An operating distance d mm which is used for determining the swipe operation corresponds to a length of the move of the fingertip during a period of time between time point t1 and time point t2. At time point t2, the transition of the pages is started.

The amplitude of the vibration pattern prepared for the swipe operation is A11. The vibration pattern prepared for the swipe operation has a driving pattern in which the vibration continues while the swipe operation is being performed.

At time point t3 when the user releases the fingertip from the top panel 120 and finishes the swipe operation, the drive controlling part 240 sets the amplitude value to zero. Accordingly, the amplitude is set to zero right after time point t3. At time point t4 which follows time point t3, the transition of the pages is completed.

In a case where the user performs the swipe operation in order to turn over or flip the page as described above, the drive controlling part 240 outputs the amplitude data having the constant amplitude (A11), for example. Therefore, the kinetic friction force applied to the user's fingertip is reduced while the user is performing the swipe operation. As a result, it becomes possible to provide the slippery or smooth touch (texture) to the user. Accordingly, the user can recognize that the swipe operation is being accepted by the electronic device 100 through the fingertip.

Next, the operation of the drive controlling part 240 in a case where the manipulation input is performed by the so-called flick operation is described with reference to FIGS. 11 and 12.

Figure 11:
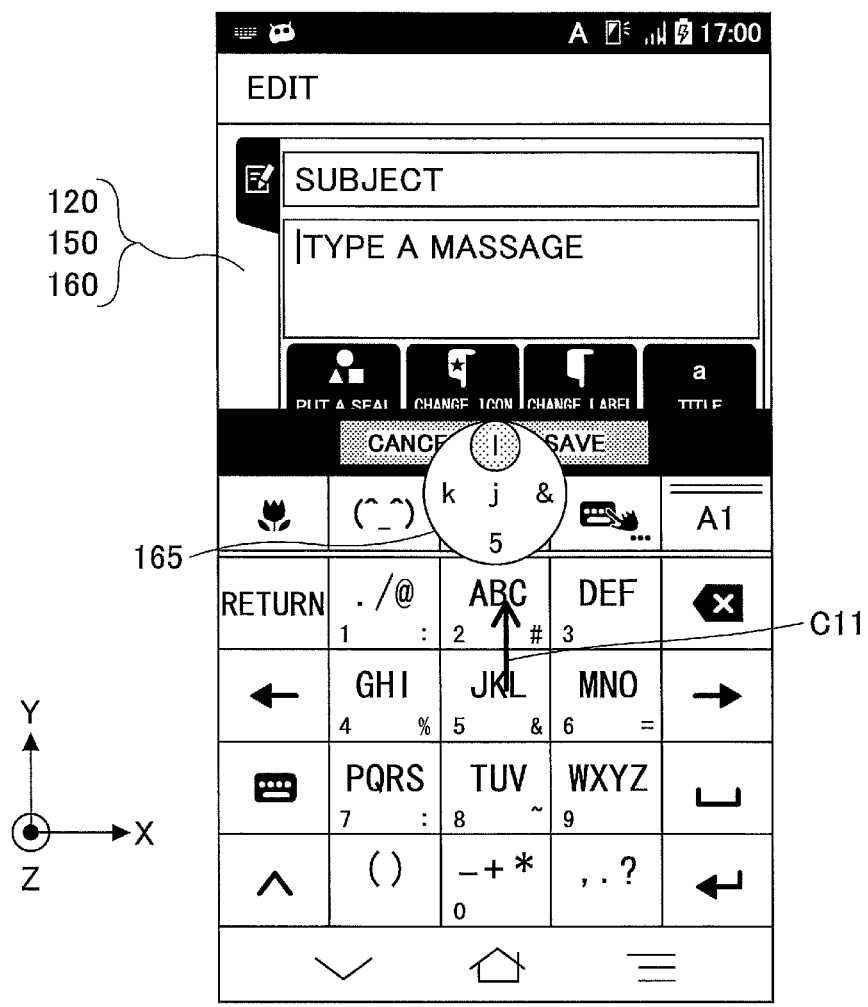
FIG. 11 is diagram illustrating an example of an operating state of the electronic device according to the embodiment.

FIG. 11 illustrates a situation where the user's fingertip touching alphabet "j" located at position C11 performs the flick operation upward along an arrow in order to select alphabet "l" in the email-edit mode. In FIG. 11, a sub-displaying area 165 shaped in a circle is displayed on the positive side in Y axis direction with respect to the GUI input part which is used for inputting "A", "B", "C", "2" or "#". The sub-displaying area 165 indicates which one is selected among "j", "k", "l", "5" and "&". In the sub-displaying area 165, alphabet "l" which is selected by the flick operation is highlighted.

Since characters are input by the flick operation of the user in the email-edit mode, the drive controlling part 240 determines whether the manipulation input is the flick operation. In the email-edit mode, the vibration is generated in the top panel 120 as follows.

Figure 12:
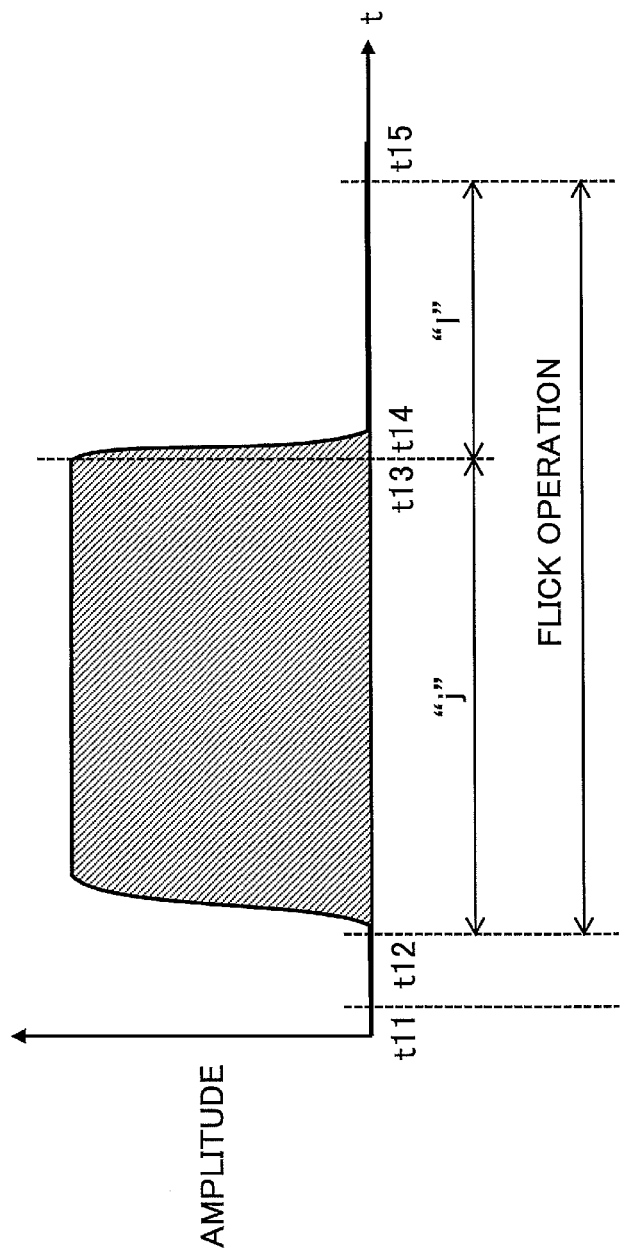
FIG. 12 is diagram illustrating an example of an operating state of the electronic device according to the embodiment.

As illustrated in FIGS. 11 and 12, the user touches the position C11 located above alphabet "j" with the fingertip at time point t11 and begins to move the fingertip in a positive Y axis direction at time point t12. The vibration is generated right after being determined that the fingertip is moved from the position C11. As a result, the slippery or smooth touch (texture) is provided to the user through the fingertip. As a result, the user can recognize that the manipulation input which is performed by moving the fingertip on alphabet "j" is accepted by the electronic device 100 through the fingertip. Since the natural vibration is generated in the top panel 120 in this situation, the user's fingertip is in a slippery condition. Therefore, it is easy to perform the flick operation.

At time point t13, the flick operation is performed so that the user selects alphabet "l", contents of the GUI input part are updated to a condition in which alphabet "l" is highlighted. In accordance with the update of the contents, the area St is updated and the amplitude is set to zero by determining that the fingertip is located outside of the designated area.

Therefore, at time point t14, the amplitude of the top panel 120 becomes zero. As a result, the kinetic friction force applied to the user's fingertip becomes greater, and the grippy or scratchy touch (texture) is provided to the user through the fingertip. Since the kinetic friction force becomes greater as described above, the user senses as if the user touches the convex portion.

Accordingly, the user can recognize that the manipulation input selecting alphabet "l" is accepted by the electronic device 100 through the fingertip.

A case where the GUI input part used for inputting "j", "k", "l", "5" or "&" is used is described with reference to FIGS. 11 and 12. In a case where the slider 102B as illustrated in FIG. 1 is operated rightward or leftward, the vibration may be generated every time the length of the move reaches a designated length. Otherwise, the top panel 120 may be vibrated in any vibration pattern in order to cause the user to sense the operation of the slider 102B.

Next, the operation of the drive controlling part 240 in a case where the manipulation input is performed in an operation mode executing the application program of a calculator is described with reference to FIGS. 13 and 14.

Figure 13:
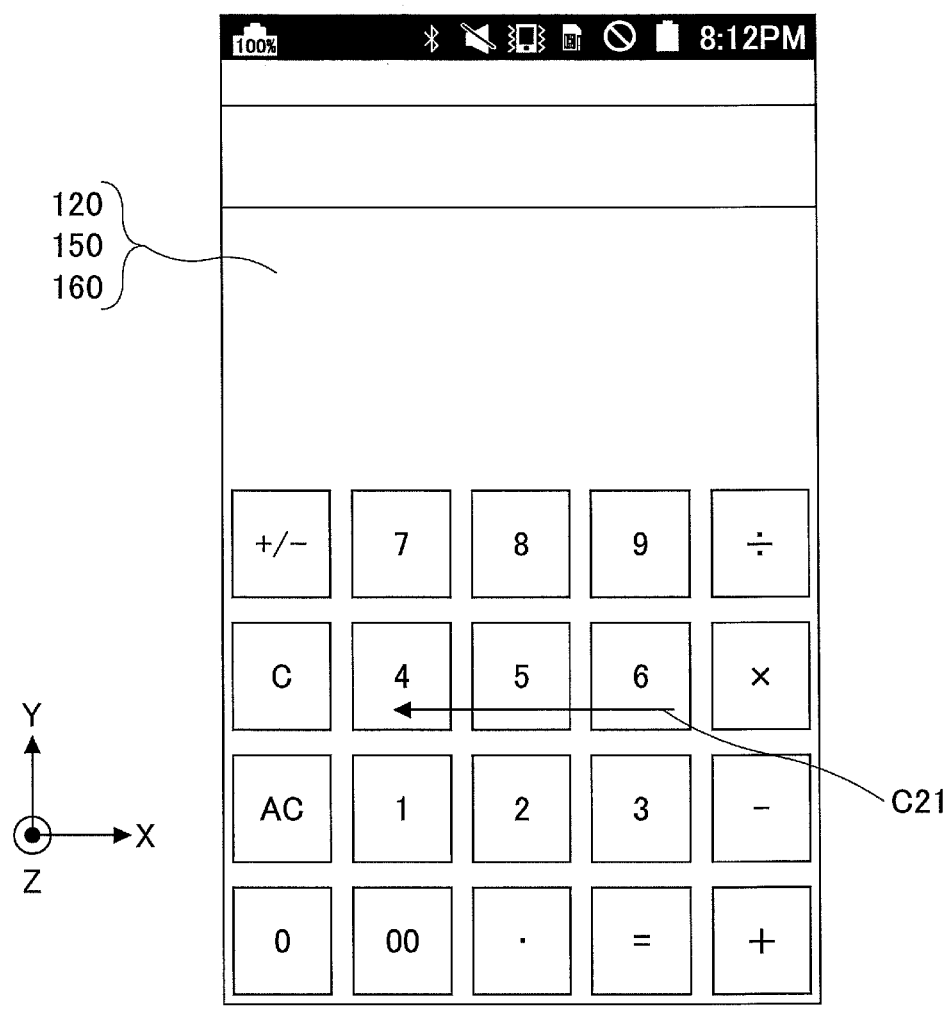
FIG. 13 is diagram illustrating an example of an operating state of the electronic device according to the embodiment.

As illustrated in FIG. 13, in the operation mode executing the application program of the calculator, the user touches a numeral '6' with the fingertip, begins to move the fingertip along the surface of the top panel 120 leftward and traces numerals "5" and "4" in this order. If the user performs the manipulation input as described above, the vibration is generated in the top panel 120 as follows. Such a manipulation input is different from the flick operation, the swipe operation and the drag operation. The manipulation input is a type of a manipulation input which is performed while the fingertip is moving across a plurality of the GUI input parts in a condition where the plurality of the GUI input parts are arranged.

In this case, as illustrated in FIG. 14, the user touches the position C21 (FIG. 13) located below numeral "6" with the fingertip and begins to move the fingertip at time point t21. As the user moves the fingertip slightly from the position C21, the position of the fingertip comes out of an area of numeral "6" and enters into an area of numeral "5" at time point t22. At time point t22 a vibration B11 having a great amplitude over a short amount of time is generated.

The generation of the vibration B11 results from the positional change of the fingertip which comes out of the area of numeral "6". The sense of touching the convex portion is provided to the user through the fingertip by changing a condition of the manipulation input surface from a low-friction-condition over the short amount of time to a high-friction-condition instantaneously.

As the fingertip further moves in the area of numeral "5" leftward, vibrations B12 are generated from time point t23 at regular intervals. Each of the vibrations B12 has a small amplitude over a short amount of time. Since numeral "5" is located in the center of a ten-key, the vibrations B12 are generated for the sake of enabling the user to sense that the fingertip is touching numeral "5" without a visual contact of the top panel 120.

As the fingertip comes out of the area of numeral "5" and enters into an area of numeral "4" at time point t24, a vibration B13 having a great amplitude is generated over a short amount of time. The vibration B13 is a type of a vibration similar to the vibration B11. The generation of the vibration B13 results from the positional change of the fingertip which comes out of the area of numeral "5" and enters into the area of "4". The sense of touching the convex portion is provided to the user through the fingertip by changing a condition of the manipulation input surface from the low-friction-condition over the short amount of time to the high-friction-condition instantaneously.

Accordingly, the user can sense that the fingertip traces numerals "6", "5" and "4" in this order.

Since the kinetic friction force applied to the user's fingertip is varied by generating the natural vibration at the ultrasound-frequency-band in the top panel 120, the electronic device 100 of the embodiment can provide a fine or crisp tactile sensation (tactile sense) to the user.

The electronic device 100 of the embodiment generates the driving signal by causing the amplitude modulator 320 to modulate only the amplitude of the sinusoidal wave at the ultrasound-frequency-band output from the sinusoidal wave generator 310. The frequency of the sinusoidal wave at the ultrasound-frequency-band generated by the sinusoidal wave generator 310 is equal to the natural vibration frequency of the top panel 120. The natural vibration frequency is determined in consideration of the weight of the vibrating element 140.

The driving signal is generated in the amplitude modulator 320 by modulating only the amplitude of the sinusoidal wave at the ultrasound-frequency-band generated by the sinusoidal wave generator 310 without modulating the frequency or the phase of the sinusoidal wave.

Accordingly, it becomes possible to generate the natural vibration of the top panel 120 at the ultrasound-frequency-band in the top panel 120 and to reduce the kinetic friction coefficient applied to the fingertip tracing the top panel 120 with absolute certainty by utilizing the layer of air provided by the squeeze film effect. It becomes possible to provide the fine or crisp tactile sensation as if the concavity or the convexity is existing on the surface of the top panel 120 by utilizing the Sticky-band Illusion effect or the Fishbone Tactile Illusion effect to the user.

Since the electronic device 100 generates the vibration in a case where the estimated coordinate point after the lapse of the required period of time Δt corresponding to the period of time of one cycle of the control cycle is located in the designated area which requires generating the vibration, it becomes possible to generate the vibration while the fingertip is touching the designated GUI input part or the like.

In a case where a delay corresponding to the required period of time Δt does not matter at all, the electronic device 100 may not perform the calculation of the estimated coordinate.

In the embodiment as described above, for the sake of providing the sense as if the concavity or the convexity is existing on the top panel 120 to the user, the vibrating element 140 is switched on or off. Turning off the vibrating element 140 is equal to setting the amplitude value represented by the driving signal used for driving the vibrating element 140 to zero.

However, it is not necessary to turn off the vibrating element 140 from a being turned on state. For example, the vibrating element 140 is driven based on the driving signal having a small amplitude instead of turning off the vibrating element 140. For example, the electronic device 100 may provide the sense as if the concavity or the convexity is existing on the surface of the top panel 120 by reducing the amplitude to about one-fifth of that of the turned on state.

In this case, the vibrating element 140 is driven by the driving signal in a manner that the vibration of the vibrating element 140 is switched between a strong level and weak level. As a result, the strength of the natural vibration generated in the top panel 120 is switched between the strong level and the weak level. It becomes possible to provide the sense as if the concavity or the convexity is existing on the surface of the top panel 120 through the user's fingertip.

If the electronic device 100 turns off the vibrating element 140 when making the vibration weaker in order to switch the vibration of the vibrating element 140 from the strong level to the weak level, the vibrating element 140 is switched off. Switching on and off the vibrating element 140 means driving the vibrating element 140 intermittently.

According to the embodiment as described above, the drive controlling apparatus 300, the electronic device 100 and the drive controlling method that can provide the fine or crisp tactile sensation to the user are provided.

It becomes possible to provide the drive controlling apparatus 300, the electronic device 100 and the drive controlling method that can provide a fine or crisp tactile sensation to a user.

In the above description, a drive controlling apparatus, an electronic device and a drive controlling method according to embodiments are described. However, the present invention is not limited to the embodiments specifically disclosed. A person skilled in the art may easily achieve various modification and changes without departing from the scope of the present invention.

The other objects, features, and benefits of the present application may become further clear by referring to the accompanying drawing and embodiments described above.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of superiority or inferiority of the invention. Although the embodiment of the present invention has been described in detail, it should be understood that various changes, substitutions, and alterations could be made hereto without departing from the sprit and scope of the invention.

What is claimed is:

1. A drive controlling apparatus that drives a vibrating element of an electronic device including a display part, a top panel disposed on a display surface side of the display part and having a manipulation input surface, a position detector detecting a position of a manipulation input performed on the manipulation input surface and the vibrating element generating a vibration in the manipulation input surface, comprising:

an amplitude modulator configured to modulate an amplitude of a wave signal in an ultrasound-frequency-band in accordance with amplitude data and to output the modulated wave signal as a driving signal to the vibrating element, the driving signal being used for driving the vibrating element, the wave signal generating a natural vibration in the ultrasound-frequency-band in the manipulation input surface, the amplitude data representing an amplitude of the driving signal; and a drive controlling part configured to output the amplitude data used for modulating the amplitude of the wave signal to the amplitude modulator and to drive the vibrating element in response to the amplitude data, the drive controlling part controlling the amplitude data so as to vary an intensity of the natural vibration in accordance with the position of the manipulation input performed onto the manipulation input surface and a temporal change degree of the position.

2. The drive controlling apparatus as claimed in claim 1, wherein the driving signal causes the vibrating element to generate the natural vibration in the ultrasound-frequency-band in the manipulation input surface, the natural vibration having a constant frequency and a constant phase.

3. The drive controlling apparatus as claimed in claim 1, wherein the drive controlling part drives the vibrating element so as to vary the intensity of the natural vibration when the position of the manipulation input moves across a boundary of a GUI input part displayed on the display part or moves while the GUI input part is being manipulated.

4. The drive controlling apparatus as claimed in claim 1, wherein the drive controlling part drives the vibrating element so as to vary the intensity of the natural vibration when the position of the manipulation input moves across pages of picture images displayed on the display part.

5. The drive controlling apparatus as claimed in claim 1, wherein the drive controlling part drives the vibrating element so as to vary the intensity of the natural vibration when the position of the manipulation input moves in an area of a designated GUI input part displayed on the display part.

6. The drive controlling apparatus as claimed in claim 1, wherein the manipulation input surface has a rectangular shape having long sides and short sides in plan view, and wherein the drive controlling part causes the vibrating element to vibrate so as to generate a standing wave on the manipulation input surface, an amplitude of the standing wave varying along the long side.

7. The drive controlling apparatus as claimed in claim 1, wherein the drive controlling part estimates the position of the manipulation input after an elapse of a designated period of time based on the temporal change degree of the position, and drives the vibrating element so as to vary the intensity of the natural vibration in accordance with the estimated position of the manipulation input.

8. The drive controlling apparatus as claimed in claim 1, wherein the vibrating element is disposed at an edge portion of the top panel in plan view.

9. The drive controlling apparatus as claimed in claim 1, wherein the vibrating element is placed outside of a display area of the display part in plan view.

10. The drive controlling apparatus as claimed in claim 1, wherein the natural vibration is a natural vibration of the top panel.

11. The drive controlling apparatus as claimed in claim 1, wherein the drive controlling part is configured to drive the vibrating element so as to vary the intensity of the natural vibration in accordance with the position of the manipulation input in an image displayed in the display part and the temporal change degree of the position.

12. The drive controlling apparatus as claimed in claim 1, wherein the drive controlling part drives the vibrating element by controlling the amplitude data so as to vary the intensity of the natural vibration in accordance with the position of the manipulation input and the temporal change degree of the position without changing frequency of the driving signal.

13. The drive controlling apparatus as claimed in claim 1, further comprising:
a wave signal generator configured to output the wave signal in the ultrasound-frequency-band, the wave signal generating the natural vibration in the ultrasound-frequency-band in the manipulation input surface.

14. The drive controlling apparatus as claimed in claim 1, further comprising:
a memory configured to store the amplitude data representing the amplitude of the driving signal and being used for modulating the amplitude of the wave signal.

15. An electronic device comprising:
a display part;
a top panel disposed on a display surface side of the display part and having a manipulation input surface;
a position detector detecting a position of a manipulation input performed on the manipulation input surface;
a vibrating element generating a vibration in the manipulation input surface;
an amplitude modulator configured to modulate an amplitude of a wave signal in an ultrasound-frequency-band in accordance with amplitude data and to output the modulated wave signal as a driving signal to the vibrating element, the driving signal being used for driving the vibrating element, the wave signal generating a natural vibration in the ultrasound-frequency-band in the manipulation input surface, the amplitude data representing an amplitude of the driving signal; and
a drive controlling part configured to output the amplitude data used for modulating the amplitude of the wave signal to the amplitude modulator and to drive the vibrating element in response to the amplitude data, the drive controlling part controlling the amplitude data so as to vary an intensity of the natural vibration in accordance with the position of the manipulation input performed onto the manipulation input surface and a temporal change degree of the position.

16. A drive controlling method for driving a vibrating element of an electronic device including a display part, a top panel disposed on a display surface side of the display part and having a manipulation input surface, a position detector detecting a position of a manipulation input performed on the manipulation input surface, an amplitude modulator generating a driving signal and the vibrating element generating a vibration in the manipulation input surface, comprising:
modulating, by the amplitude modulator, an amplitude of a wave signal in an ultrasound-frequency-band in accordance with amplitude data and outputting the modulated wave signal as a driving signal to the vibrating element, the driving signal being used for driving the vibrating element, the wave signal generating a natural vibration in the ultrasound-frequency-band in the manipulation input surface, the amplitude data representing an amplitude of the driving signal; and
outputting, by a computer, the amplitude data used for modulating the amplitude of the wave signal to the amplitude modulator and driving the vibrating element in response to the amplitude data, the driving being configured to control the amplitude data so as to vary an intensity of the natural vibration in accordance with the position of the manipulation input performed onto the manipulation input surface and a temporal change degree of the position.

17. The drive controlling method as claimed in claim 16, wherein the driving signal causes the vibrating element to generate the natural vibration in the ultrasound-frequency-band in the manipulation input surface, the natural vibration having a constant frequency and a constant phase.

18. The drive controlling method as claimed in claim 16, wherein the driving is performed so as to vary the intensity of the natural vibration when the position of the manipulation input moves across a boundary of a GUI input part displayed on the display part or moves while the GUI input part is being manipulated.

19. The drive controlling method as claimed in claim 16, wherein the driving is performed so as to vary the intensity of the natural vibration when the position of the manipulation input moves across pages of picture images displayed on the display part.

20. The drive controlling method as claimed in claim 16, wherein the driving is performed so as to vary the intensity of the natural vibration when the position of the manipulation input moves in an area of a designated GUI input part displayed on the display part.

21. The drive controlling method as claimed in claim 16, wherein the manipulation input surface has a rectangular shape having long sides and short sides in plan view, and
wherein the driving causes the vibrating element to vibrate so as to genarate a standing wave on the manipulation input surface, an amplitude of the standing wave varying along the long side.

22. The drive controlling method as claimed in claim 16, further comprising:
estimating the position of the manipulation input after an elapse of a designated period of time based on the temporal change degree of the position,
wherein the driving is performed so as to vary the intensity of the natural vibration in accordance with the estimated position of the manipulation input.

23. The drive controlling method as claimed in claim 16, wherein the natural vibration is a natural vibration of the top panel.

24. The drive controlling method as claimed in claim 16, wherein the driving is configured to drive the vibrating element so as to vary the intensity of the natural vibration in accordance with the position of the manipulation input in an image displayed in the display part and the temporal change degree of the position.

25. The drive controlling method as claimed in claim 16, wherein the driving is configured to drive the vibrating element by controlling the amplitude data so as to vary the intensity of the natural vibration in accordance with the position of the manipulation input and the temporal change degree of the position without changing frequency of the driving signal.

* * * * *